July 25, 1939.  D. SCIAKY  2,167,553
APPARATUS FOR MEASURING ELECTRIC ENERGY
Original Filed Aug. 6, 1934    2 Sheets-Sheet 2
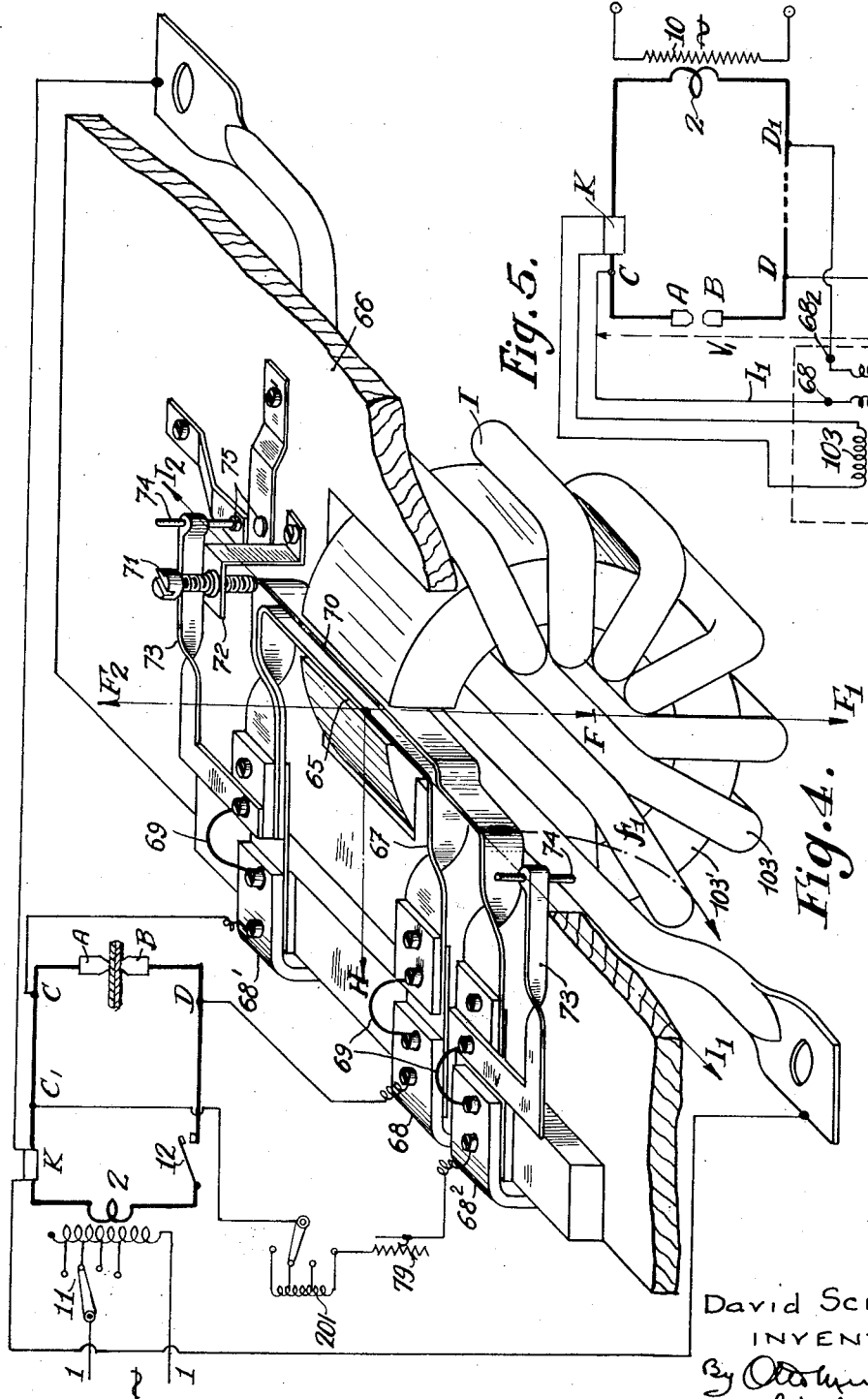
David Sciaky
INVENTOR Patented July 25, 1939

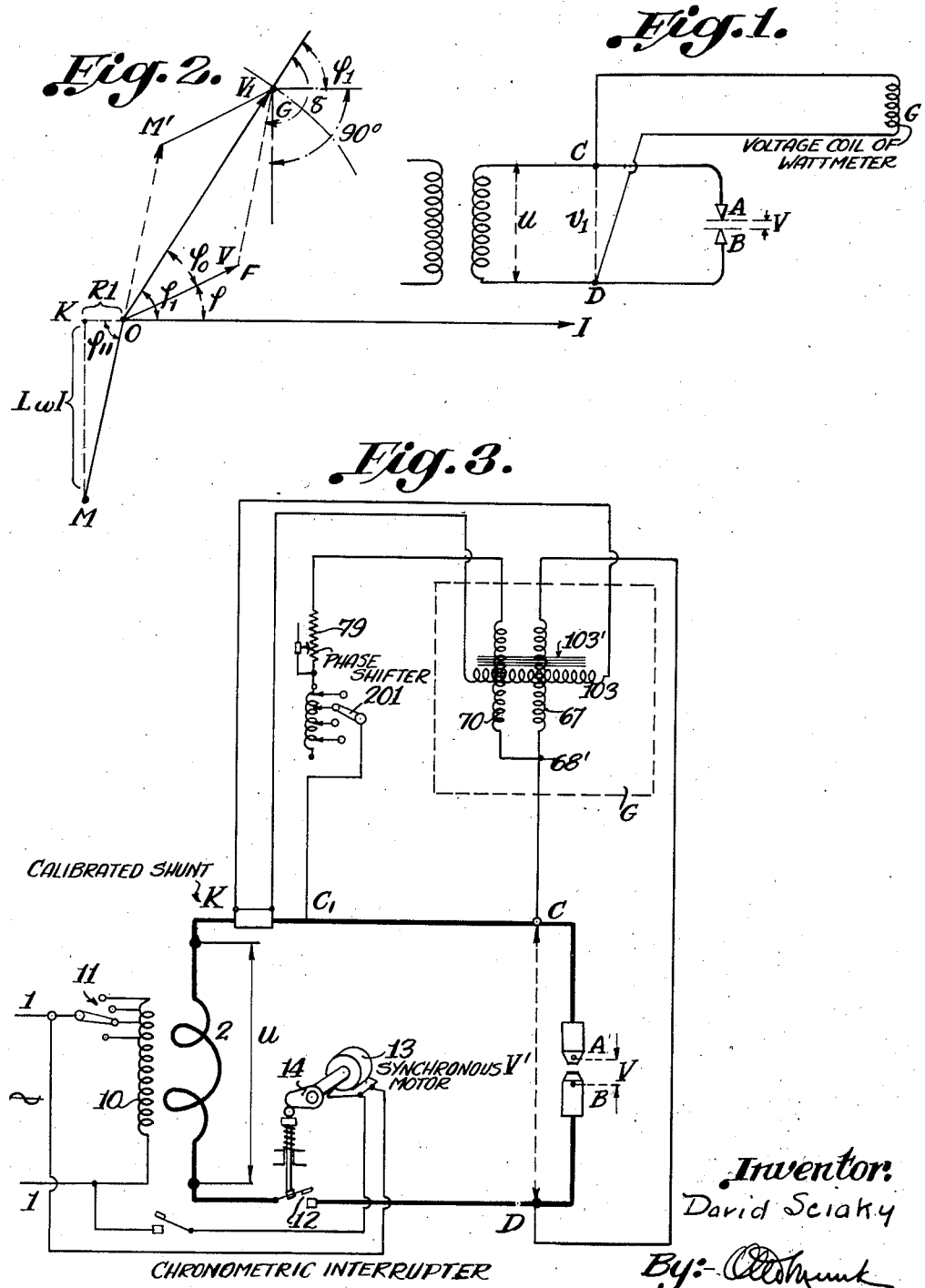

2,167,553

UNITED STATES PATENT OFFICE 2,167,553

APPARATUS FOR MEASURING ELECTRIC ENERGY

David Sciaky, Paris, France

Original application August 6, 1934, Serial No. 738,647. Divided and this application April 23, 1936, Serial No. 75,977. In France August 16, 1933

5 Claims. (Cl. 171—95)

The present invention relates to an apparatus for measuring the energy developed at the welding point of a welding circuit for the purpose of obtaining accurate indications as to the energy developed at the welding point in spite of the errors introduced due to the fact that the measuring instrument cannot be connected to the inaccessible points proper where the welding energy is actually developed but must be connected to points which are easily accessible.

The present invention is a division of my patent application, Ser. No. 738,647, filed August 6, 1934, and issued into Patent 2,054,343.

It has been proposed to control, by various means, both the conditions attending electric spot welding operations as well as the corresponding operation of the machine. To this end thermic or magnetic ammeters are generally used, which measure either $$\int_{t_1}^{t_2} i\, dt$$

or $$\int_{t_1}^{t_2} i^2\, dt$$

or even $$\int_{t_1}^{t_2} ui\, dt$$

$t_1$ being the time element at the beginning of the welding, $t_2$ being the time element at the end of the operation, $i$ the intensity of the welding current and $u$ the voltage at the terminals of the source of energy at any given moment.

If only $\int i\, dt$ or $\int i^2\, dt$ is measured, it is admitted that the power dissipated in the welding operation is a function of the intensity of the current because, inasmuch as the potential difference in the feeding circuit remains constant, only the resistance during the welding intervenes to modify the current intensity.

In either case the measurement is not accurate, because the length and the form of the arms of the welding tongues as well as the presence of pieces of magnetic metal in the arms of the welding machine considerably modify the power applied in the use of a given current.

Contrary to the said known procedures, the present invention relates to an electric welding device which is characterized by the fact that the energy, which is developed during the welding operation proper, is measured by causing the voltage present at the points of application of the electrodes to the metal sheets to be welded, to take part in the measurement.

In fact, the device according to the invention measures $$\int_{t_1}^{t_2} vi\, dt$$

wherein, however, $v$ does not represent the input potential difference $u$, but rather the voltage at the points of application of the electrodes to the metal sheets to be welded.

It is known that, if the current which serves for operating the device, is an alternating and sinusoidal one, the above-mentioned integral function gives $$(vi\cos\varphi)\frac{t_1}{t_2}$$

In other words, the angle $\varphi$ is thus introduced which corresponds to the phase shifting between the voltage and the current.

In practice it is very difficult to connect the measuring coil at the electrode points, which are inaccessible.

One object of the present invention is to overcome the above described difficulties.

A further object of the invention is to devise an apparatus for the measurement of the energy developed at the welding point of an electric welding circuit.

A still further object of the invention is to obtain in a measuring system of this type exact indications of the real energy utilized at the welding point, in spite of the errors due to the fact that the measuring instrument cannot be connected to the electrodes pinching the work pieces and between which the energy of the weld is developed, as these electrodes are inaccessible but must be branched to accessible points spaced from the electrodes.

The objects of the present invention are accomplished by apparatus described in the following specification, set forth in the appended claims and illustratively exemplified in the accompanying drawings, in which Fig. 1 shows diagrammatically a method of connecting a voltage coil of a wattmeter to accessible points of a welding circuit.

Fig. 2 is a tension diagram of the current measured according to the present invention, Fig. 3 is the simplified diagram of a wiring circuit for carrying out a measurement according to the invention, Fig. 4 is a perspective view of a wattmeter according to the invention connected in a diagrammatically indicated welding circuit, and Fig. 5 is a simplified wiring diagram of a modified embodiment of a measuring circuit according to the invention.

As shown in Fig. 1, the voltage coil of a wattmeter G is connected to two points C and D which are accessible and spaced from the electrodes A and B. The measured tension $v_1$ is thus different from the tension $v$ between the electrodes A and B. The conductor elements CA and BD introduce into the measurement errors, which are caused by the ohmic resistance and the self-induction of said elements.

According to the present invention, the inexact tension $v_1$ is corrected by subjecting it to an initial phase shifting $\varphi_0$ relative to the welding current passing through the current circuit of the wattmeter. Thus, in the measurement, the tension $v$ is replaced by a tension $v_1$ tapped at two easily accessible points C and D, the wattmeter being designed not for measuring $vI \cos \varphi$, but for measuring a function: $v_1 I \cos(\varphi + \varphi_0)$, the angle $\varphi_0$ compensating for the error introduced by the conductors CA and DB of the machine.

Fig. 2 represents, in conformity with the usual rules of electro-technics, the principle according to which the correction of the inexact tension $v_1$ tapped at the accessible points C and D of the welding circuit is effected.

In the diagram of Fig. 2, I is the vector representing the intensity of the current at the welding point, $v$ is the tension, magnitude and phase, between the electrodes A and B. This tension is to be measured, but it is inaccessible. $v_1$ is the tension, magnitude and phase, at the points C and D of the feed circuit; this tension is accessible.

In passing through the work pieces to be welded, the current intensity I is subject to a variable phase shifting $\varphi$ with respect to the voltage $v$. The amount of this phase shifting depends upon the pressure of the electrodes and upon the magnetic (inductive) properties of the material treated. The variable angle $\varphi$ is that which must be taken into consideration in the wattmeter.

The tension $v_1$, which acts in the wattmeter differs from $v$ by a quantity equal to the complex voltage drop which occurs between the accessible tapping points C, D and the electrodes points A, B.

This tension drop is composed of an active quantity RI (R being the resistance of the two conductors sectors CA and DB) and of a reactive quantity $\omega L \times I$, in advance of $$\frac{\pi}{2}$$

with respect to the current I due to the pieces of magnetic material situated in the neighbourhood of said conductors. The resultant of these two values, proportional to the impedance of the considered section, is represented by the vector OM.

The values R and $L\omega$ are known and serve to determine the initial phase shifting $\varphi_0$ to be introduced into the measurement.

The tension $v_1$ utilized in the wattmeter is thus the geometric sum of the tension $v$ and the additional tension OM required to overcome the impedance between the points C and A on the one hand and D and B on the other hand.

The present invention corrects the inexact tension $v_1$ tapped at the acessible points C and D by combining therewith a corrective tension OM equal in its absolute value to the ohmic and inductive tension drop in the conductors CA and BD of the machine.

The invention may be carried out by means of a device comprising a working circuit including the welding electrodes, a wattmeter shunted to said circuit, and any conventional phase shifting means producing a phase difference between one electrical characteristic of the wattmeter and a corresponding characteristic of the working current.

Figs. 3 to 5 illustrate two embodiments of such installation.

In Fig. 3, the reference characters 1—1 denote the input conductors of an alternating current circuit, to which is branched the primary winding 10 of a transformer 10—2 by means of variable switch 11. The secondary 2 of the transformer supplies current to the welding machine controlled by a chronometric interrupter 12 driven by a synchronous motor 13. The motor 13 actuates a cam 14 for the exact regulation of the time during which the welding circuit remains closed.

The welding circuit comprises the conductors C₁C, CA and DB for feeding the current to the electrodes A and B.

G denotes the assembly of electric circuits constituting the wattmeter which serves for measuring the energy developed at the welding point. The wattmeter G comprises a current coil 103 branched to the welding circuit by means of a calibrated shunt K, a principal tension coil 67 connected to the tapping points C and D and a corrective tension coil 70 connected to the points C₁ and C of one of the feeding conductors in such a manner, that the corrective coil at any moment of the welding operation is traversed by a current in opposite direction to that which passes through the principal tension coil 67. Generally, the conductor C₁C may have electrical characteristics different from those of the conductors CA and BD. In this case it is necessary to introduce into the circuit of the coil 70 means for producing an initial phase shifting $\varphi_0$ corresponding to that created by the inactive conductors of the machine. Any purely conventional phase-shifting means may serve the purpose, as for instance, as adjustable reactance 201 and a rheostat 79.

The current coil 103 of the wattmeter excites an iron core 103', which acts upon the two parallel disposed tension coils 67 and 70.

The wattmeter illustrated in Fig. 4 comprises the same elements as the device G of Fig. 3, i. e. a current coil 103 wound upon a magnetic core 103' shaped as a ring interrupted by a gap 65. The slotted portion of the core 103' projects through a window provided in the insulating plate 66. The current coil 103 is connected to the working circuit by means of a calibrated shunt K.

The principal tension coil of the wattmeter is constituted by a metallic band 67 arranged edgewise in the air gap of the core 103' and forming a half-turn. The ends of said band are twisted to lie flat in front of the small plates 68, 68' and 68² which are mounted on the insulating plate 66 and to which said band ends are secured by means of spring blades 80, 81, 82. The electrical connection is insured by means of small plaited cables 69. The corrective tension coil 70 of the moving coil unit is formed in the same manner as the principal voltage coil 67. The corrective coil 70 is connected at one end to the terminal or plate 68' connected in turn to the tapping point C, and at its other end to the point $C_1$ disposed at a point spaced from C by means of the plate $68_2$ and the devices 79—201 regulating the initial phase shifting between the corrective tension and the welding current I are connected in this circuit.

The movable coil unit of the wattmeter is constituted by the assembly of the metallic bands 67—70, the ends of said bands connected to the common plate 68' being secured solidly together, as these ends are mounted on the same spring blade 80. The fact that the other ends of the two bands are separate and connected to different plates 68 and $68_2$ does not prevent the metallic bands 67—70 from being deflected under the influence of the magnetic field produced in the gap 65 simultaneously and as a unit.

The axis about which the moving coil unit 67—70 oscillates is defined by the front edges of the plates 68', 68 and $68_2$ in contact with the spring blades 80, 81, 82.

The winding of the current coil 13 and the connections of the bands 67, 70 to the working circuit are arranged in such a manner that the resulting deflecting force exerted by the magnetic field of the core 103 on the movable coil unit has the direction of the dot and dash arrow $f^1$ in Figure 4.

The wattmeter of Fig. 4, which is of the electrodynamic type, operates as follows: The direction of the current I traversing the current coil is chosen in such a manner that the constant magnetic field set up in the gap 65 is represented by the dot and dash vector H.

The current traversing the metallic band 67 (main voltage circuit) is represented by the dot and dash vector $I_1$. Then, according to Ampere's law, the force exerted by the magnetic field H on the band 67 traversed by the current $I_1$ can be represented by the vertically downward directed dot and dash vector $F_1$.

The current $I_2$ traverses the band 70 in a direction opposite to that of $I_1$, and the band 70 is thus subjected, on account of the field H, to an upwardly directed force $F_2$ having an absolute value greatly inferior to that of $F_1$. The resultant mechanical action F is in each case equal to the arithmetic difference $F_1-F_2$ (algebraic sum).

However, as $I_1$ and $I_2$ are two sinusoidal values, having their relative phases shifted an angle $\gamma>90°$ and close to $180°$, which angle is in fact $\gamma=\varphi_1+90°+$complementary angle of $\varphi''$ (see diagram of Fig. 2), the forces $F_1$ and $F_2$ vary in an opposite sense during the passage of the welding current.

The numerical value of the resultant force F which acts on the movable coil unit 67—70 is approximately equal to $$\frac{Hli}{10}$$

H being the magnetic field in the gap 65 in gauss, $l$—the length of the portions of the bands 67 and 70 disposed in the gap 65 in centimeters, and $i$—the resultant current in the bands 67—70, i. e., $I_1-I_2$ in amperes.

In the above formula F is expressed in dynes. To obtain F in grams the formula $$F=\frac{Hli}{9810}$$

can be used, in which H is assumed as being uniform.

The above described moving coil unit engages, in rest position, two symmetrically located screws 71 (only one of which is shown) each of which extends through a bracket fixed to the insulating plate 66. The movable coil unit is provided on either side with an arm 73 adapted to act through an insulating finger 74 to close a pair of contacts 75. The contacts 75 are arranged in such a manner that either one pair of them or both pairs are closed depending upon the amplitude of displacement of the moving coil unit.

It is advantageous to choose the mechanical characteristics of the spring blades 80, 81, 82 supporting the conductive bands 67 and 70 and the inertia of said bands relative to the axis of displacement in such a manner, that the movable coil unit of the wattmeter has a ballistic nature, i. e., has an oscillation period which is very great relative to the length of the time during which the displacing force is applied, i. e. relative to the duration of passage of the welding current, which latter is a small fraction of a second.

It is known, that in ballistic wattmeters, the inertia of the movable coil unit suffices to enlarge the kinetic energy ($\frac{1}{2}$ mv. 2) developed during the extremely short time of the welding operation and to effectively start its deflection when the welding itself has already been completed.

Instruments of this type measure exactly the electric energy expended, i. e., the product of power and duration of application $$\left(\int_{t_1}^{t_2} uidt\right)$$

The arrangement of a ballistic wattmeter provides for exact measurement of the energy even if the time of the welding operations is extremely short, as for instance one twenty-fifth of a second.

The welding machine, the wiring diagram of which is illustrated in Fig. 5, has the advantage to automatically compensate the error due to the position of the tapping points C, D, spaced from the electrode points A, B.

In this arrangement, the arms CA and DB have the same total length as the circuit section $DD_1$ of the conductor, to the extremities of which section the corrective coil 70 of the wattmeter G is connected. As the cross-section of the conductors is constant, the sectors CA+DB and $DD_1$ have the same ohmic resistance. Moreover, these conductor sectors are disposed, in the assembly of the welding machine, in such a manner that they are subject to equal self-induction owing to the pieces of magnetic material disposed in the neighbourhood of the sectors. In this arrangement, there will be phase shiftings of equal value between the tapping points CD and the electrodes on the one hand and between the tapping points D and $D_1$ on the other hand. Consequently, whatever the value of the welding current will be, the corrective tension acting in the coil 70 will be automatically determined by the voltage drop between $D_1$ and D equal to RI in the arms CA, DB, and by a phase difference relative to the current I according to the formula $$tg\varphi''=\frac{\omega L}{R}$$

R being the ohmic resistance in the conductors CA and DB, L being their self-induction and $\omega L$ being their reactance.

I claim:

1. In an electric welding device a working circuit comprising welding electrodes, a wattmeter, having a current coil in shunt with said working circuit and two voltage coils, one of said voltage coils being branched to said working circuit at two accessible tapping points on opposite sides of and spaced from the electrode points and a corrective voltage circuit including the second voltage coil and a phase shifting means and being connected to two accessible points of the working circuit at one and the same side of the electrodes, said corrective circuit being arranged and adapted to transmit to said second voltage coil a tension equal and opposed to the complex ohmic and inductive voltage drop occurring between said tapping points and said electrode points.

2. A device, as claimed in claim 1, in which the part of the working circuit between said tapping points for the first voltage coil and the part of the working circuit between the points, to which said corrective circuit is connected, have equal ohmic resistances and are disposed in the device to be subject to equal magnetic inductances due to the presence of magnetic masses in the neighbourhood of the working circuit.

3. A device, as claimed in claim 1, in which said wattmeter is formed as a ballistic wattmeter.

4. A device, as claimed in claim 1, in which said wattmeter comprises a magnetic core upon which said current coil is wound, both said voltage coils being disposed in the magnetic field of said current coil, said first voltage coil being adapted and arranged to modify said magnetic field in a predetermined direction, and said second voltage coil being adapted and arranged to modify said magnetic field in the opposite direction.

5. A device, as claimed in claim 1, in which said wattmeter includes a common flexible carrier for said two voltage coils, said common carrier being movable with respect to said current coil.

DAVID SCIAKY.